(12) United States Patent
Visoky et al.

(10) Patent No.: US 10,764,063 B2
(45) Date of Patent: Sep. 1, 2020

(54) DEVICE SPECIFIC CRYPTOGRAPHIC CONTENT PROTECTION

(71) Applicant: Rockwell Automation Technologies, Inc., Mayfield Heights, OH (US)

(72) Inventors: Jack Michael Visoky, Willoughby, OH (US); Kevin Fonner, North Canton, OH (US); Eugene Mourzine, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 108 days.

(21) Appl. No.: 15/457,924

(22) Filed: Mar. 13, 2017

(65) Prior Publication Data

US 2017/0302456 A1 Oct. 19, 2017

Related U.S. Application Data

(60) Provisional application No. 62/322,091, filed on Apr. 13, 2016.

(51) Int. Cl.
| | | |
|---|---|---|
| *H04L 29/06* | (2006.01) | |
| *H04L 9/32* | (2006.01) | |
| *H04L 9/08* | (2006.01) | |
| *H04L 9/14* | (2006.01) | |
| *H04L 9/30* | (2006.01) | |
| *G05B 19/418* | (2006.01) | |
| *H04L 29/08* | (2006.01) | |

(52) U.S. Cl.
CPC ........ *H04L 9/3263* (2013.01); *G05B 19/4185* (2013.01); *H04L 9/0861* (2013.01); *H04L 9/0894* (2013.01); *H04L 9/14* (2013.01); *H04L 9/30* (2013.01); *H04L 63/0428* (2013.01); *H04L 63/0442* (2013.01); *G05B 2219/36542* (2013.01); *H04L 67/12* (2013.01); *H04L 2463/062* (2013.01)

(58) Field of Classification Search
CPC . H04L 9/3263; H04L 63/0442; H04L 9/0861; H04L 9/0894; H04L 9/30; H04L 9/14; H04L 63/0428; H04L 67/12; H04L 2463/062; G05B 19/4185
USPC .................................................. 713/155, 166
See application file for complete search history.

(56) References Cited

U.S. PATENT DOCUMENTS

| | | | | |
|---|---|---|---|---|
| 8,964,974 | B2 * | 2/2015 | Holmdahl | G01D 4/006 380/44 |
| 10,303,891 | B2 * | 5/2019 | Ekle | G05B 19/4185 |
| 2005/0229004 | A1 * | 10/2005 | Callaghan | G06F 21/33 713/185 |
| 2006/0136748 | A1 * | 6/2006 | Bade | G06F 21/33 713/193 |

(Continued)

*Primary Examiner* — Jahangir Kabir

(57) ABSTRACT

Techniques to facilitate protecting control data used in an industrial automation environment are disclosed herein. In at least one implementation, an encryption key pair is generated for an industrial controller, wherein the encryption key pair comprises a public key and a private key. The private key is stored within a secure storage system of the industrial controller. Controller program content is then encrypted using the public key to generate encrypted controller content. The encrypted controller content is then provided to the industrial controller, and the industrial controller is configured to decrypt the encrypted controller content using the private key and execute the controller program content.

20 Claims, 5 Drawing Sheets

(56) References Cited

U.S. PATENT DOCUMENTS

| | | | |
|---|---|---|---|
| 2009/0276620 A1 | 11/2009 | McCarron et al. | |
| 2013/0243188 A1* | 9/2013 | Emigh | H04L 9/30 380/30 |
| 2015/0046697 A1* | 2/2015 | Galpin | H04L 63/0884 713/155 |
| 2015/0055779 A1* | 2/2015 | Enomoto | G08C 17/00 380/270 |
| 2015/0365240 A1* | 12/2015 | Callaghan | H04L 67/12 713/156 |

* cited by examiner

DEVICE SPECIFIC CRYPTOGRAPHIC CONTENT PROTECTION

RELATED APPLICATIONS

This application claims the benefit of, and priority to, U.S. Provisional Patent Application No. 62/322,091, entitled "DEVICE SPECIFIC CRYPTOGRAPHIC CONTENT PROTECTION", filed Apr. 13, 2016, which is hereby incorporated by reference in its entirety for all purposes.

TECHNICAL FIELD

Aspects of the disclosure are related to computing hardware and software technology, and in particular to industrial automation applications.

TECHNICAL BACKGROUND

Industrial automation environments utilize machines during the industrial manufacturing process, such as drives, pumps, motors, and robots. These machines typically have various moving parts and other components that are driven by instructions received from industrial controller systems. Machine builders, Solution Providers, and other content creators typically produce the control logic needed to run on these controllers to control the machines.

In addition to controller logic, other content may be employed or generated during industrial automation operations, such as data sets, drive parameters, cam tables, product formulations, recipes, production data, and human-machine interface (HMI) components. An HMI receives and processes status data from the machines to generate various graphical displays. For example, an HMI graphical display might indicate status metrics of a drive, the pressure of a pump, the speed of a motor, or the output of a robot. The HMI may also provide a mechanism for an operator to send control instructions to an industrial controller system that controls a machine. For example, an operator might use the HMI to direct the control system to update drive parameters, turn on a pump, speed-up a motor, or stop a robot.

OVERVIEW

Provided herein are systems, methods, and software to facilitate protecting control data used in an industrial automation environment. In at least one implementation, an encryption key pair is generated for an industrial controller, wherein the encryption key pair comprises a public key and a private key. The private key is stored within a secure storage system of the industrial controller. Controller program content is then encrypted using the public key to generate encrypted controller content. The encrypted controller content is then provided to the industrial controller, and the industrial controller is configured to decrypt the encrypted controller content using the private key and execute the controller program content.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
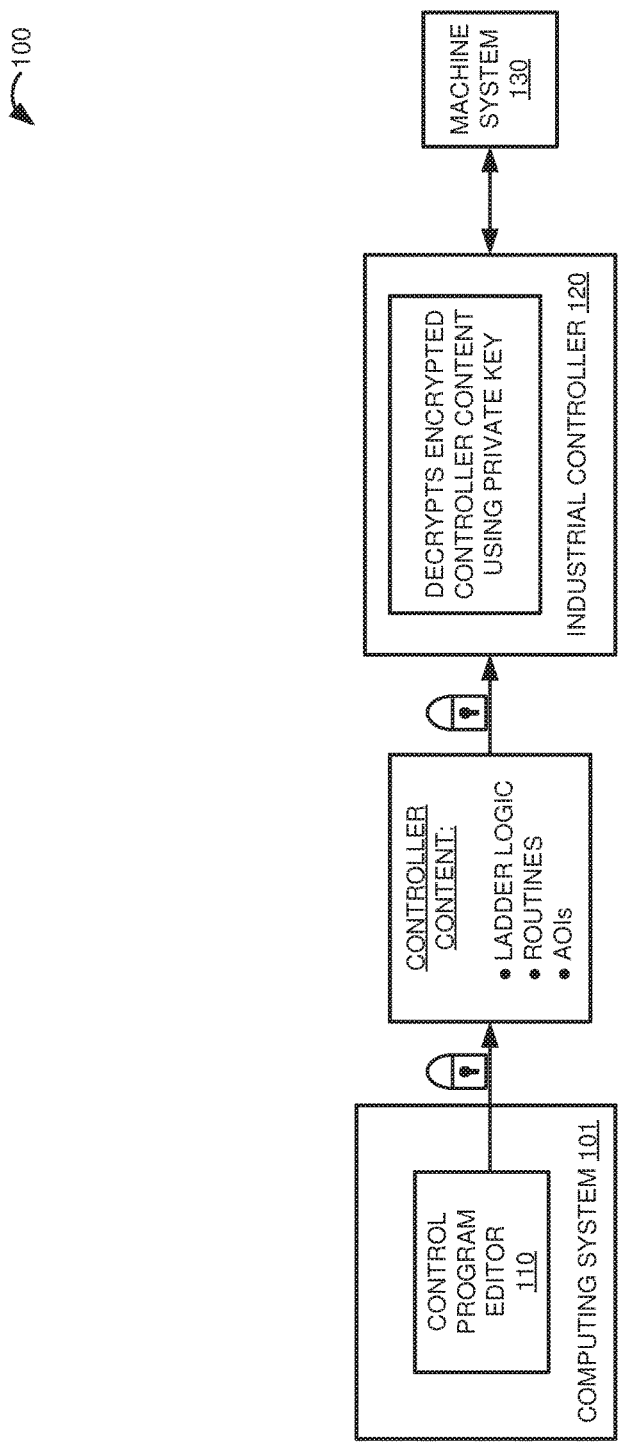
FIG. 1 is a block diagram that illustrates an industrial automation environment and an operational scenario that describes protection of control data in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for digital rights management of intellectual property related to industrial automation. For example, integrated architecture control systems can be utilized by solution providers or system integrators to produce controller program content, such as machine logic, configuration data, routines, add-on instructions (AOIs), and other content used to program logic controllers that control the operation of machines used in industrial automation. Such controller program content should be protected from viewing, editing, or execution by unauthorized parties. Disclosed herein is a content control system for controlling access to and usage of controller program content, including controller project files and other control data. With this system, machine builders, content creators, original equipment manufacturers (OEMs), and solution providers can control the exposure of their intellectual property and control which devices the content will run on, even if the device is running in an uncontrolled or potentially hostile environment or the content needs to be sent over unsecured networks.

To achieve this protection, a unique public/private encryption key pair is generated for each device on which protected content will be run. The private key may be stored within the device in secure storage hardware. The public key is then included in a certificate that is generated and signed by a certificate authority. At this point, content is then encrypted using the public key of the device, which ensures that only the device is able to decrypt the content. Future content can be generated by the content creator and encrypted specifically for this device. Beneficially, even if the device exists in a potentially hostile environment, the content can be transmitted to the device such that the confidentiality of the content will be maintained. Note that the public/private encryption key pair and certificate authority can be generated either by the content creator or by the device vendor, but in either case the steps remain the same to protect the content. Furthermore, additional security benefits can be realized through using more than one encryption key. For example, a key could be stored within the controller's secure storage as well as one that is contained with secure storage on removable media, such as a secure digital (SD) card.

Figure 2:
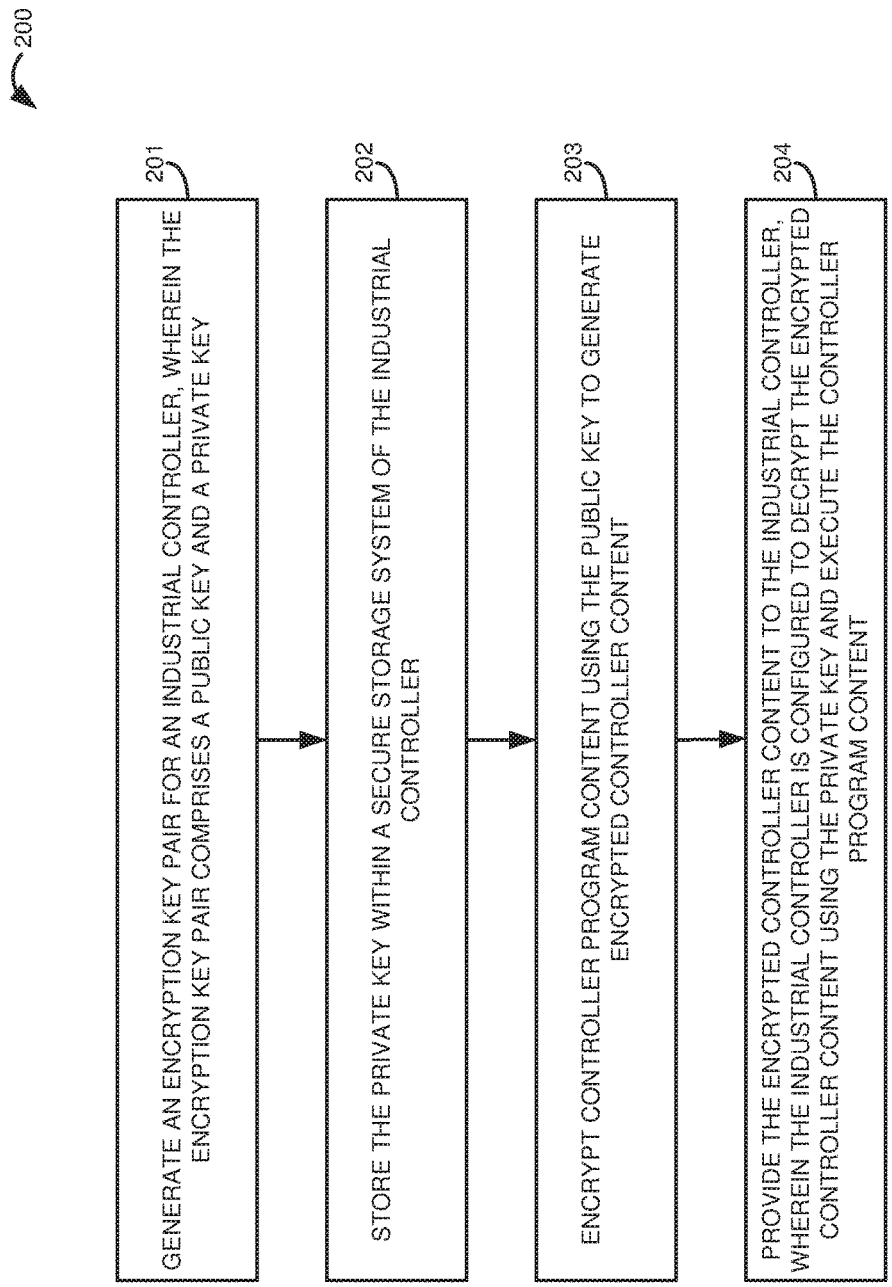
FIG. 2 is a flow diagram that illustrates an operation of an industrial automation environment in an exemplary implementation.
Figure 3:
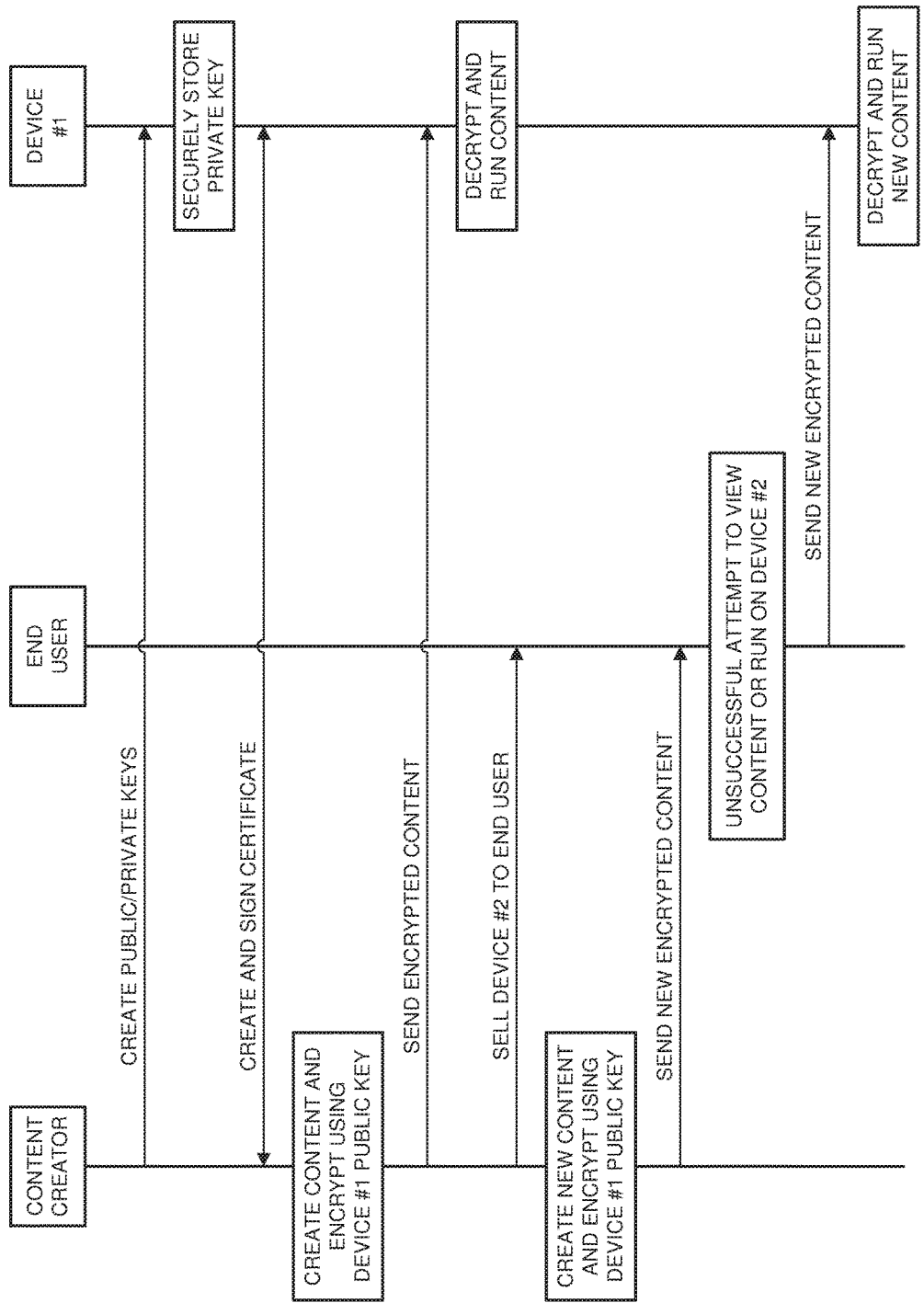
FIG. 3 is a sequence diagram that illustrates an operation to encrypt content for a device in an exemplary implementation.
Figure 4:
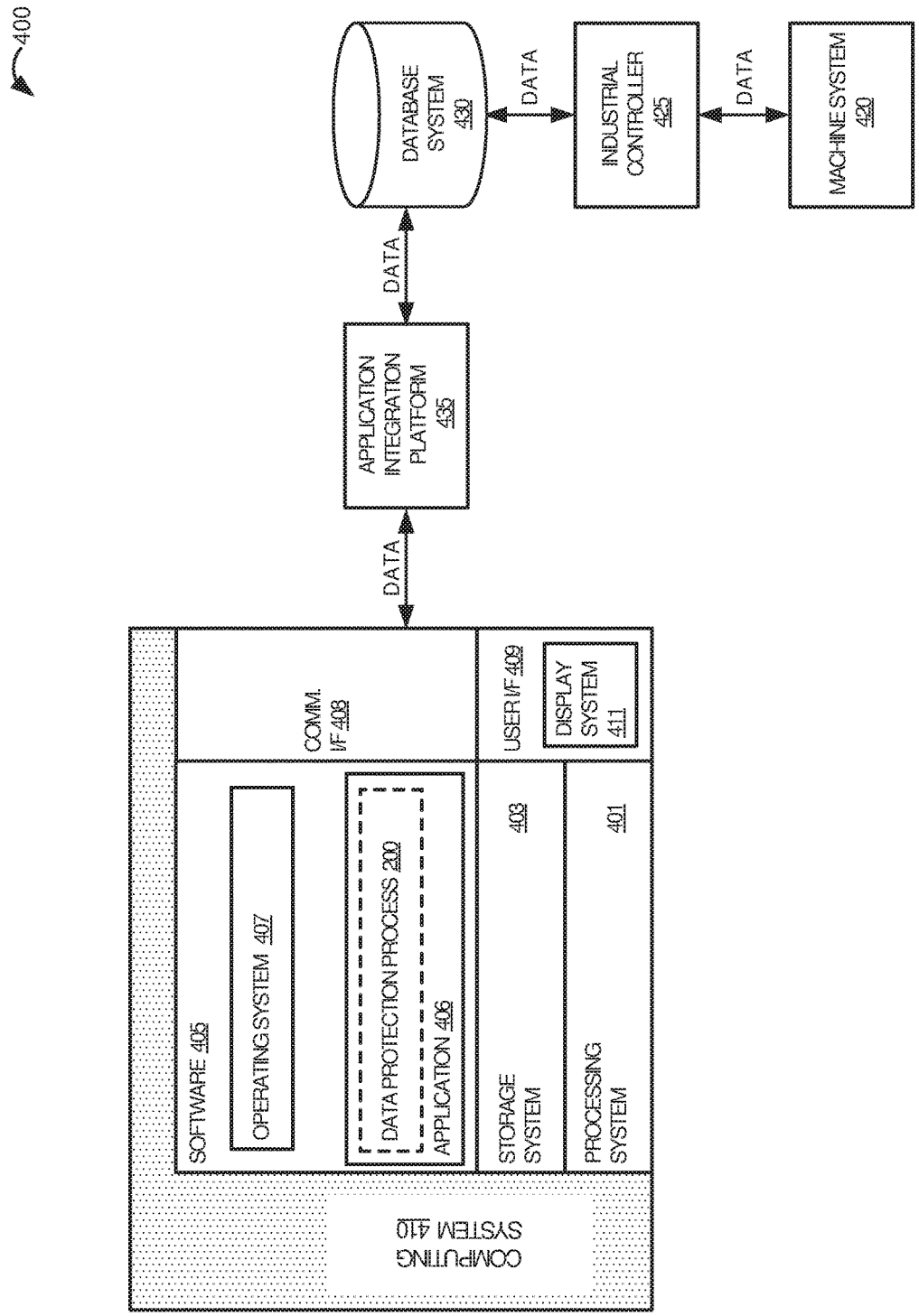
FIG. 4 is a block diagram that illustrates an operational scenario involving a computing system in an industrial automation environment in an exemplary implementation.
Figure 5:
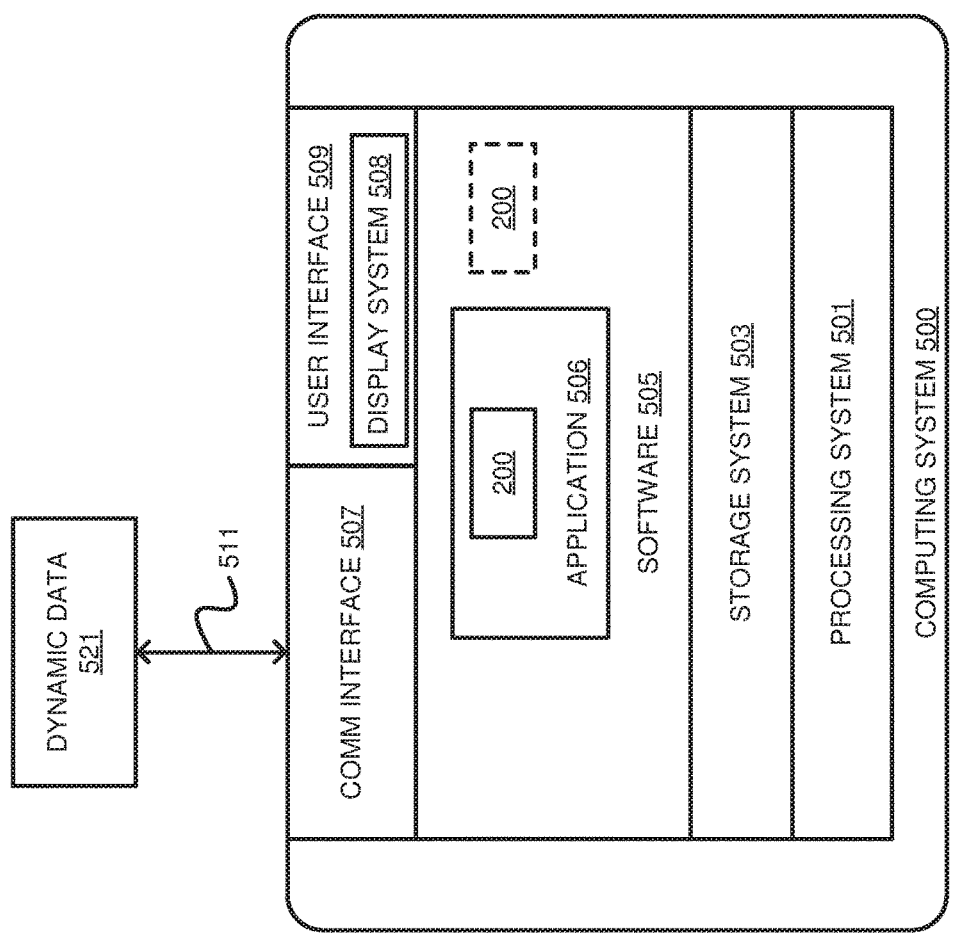
FIG. 5 is a block diagram that illustrates a computing system in an exemplary implementation.

Referring now to the drawings, FIG. 1 illustrates an exemplary industrial automation environment and an operational scenario that describes protection of control data in an exemplary implementation. FIG. 2 illustrates a flow diagram of an operation to facilitate protecting control data used in an industrial automation environment. FIG. 3 illustrates a sequence diagram of an operation to encrypt content for a device in an exemplary implementation. FIG. 4 illustrates an exemplary industrial automation environment that includes a computing system that may be used to execute a data protection process, and FIG. 5 illustrates an exemplary computing system that may be used to perform any of the processes and operational scenarios described herein.

Turning now to FIG. 1, a block diagram that illustrates industrial automation environment 100 in an exemplary implementation is shown. Industrial automation environment 100 includes computing system 101, industrial controller 120, and machine system 130. Industrial controller 120 and machine system 130 are in communication over a communication link. Computing system 101 is shown running control program editor 110. In some examples, control program editor 110 could comprise an RSLogix™ system or a Studio 5000® environment provided by Rockwell Automation, Inc. Note that there would typically be many more machine systems in most industrial automation environments, but the number of machine systems shown in FIG. 1 has been restricted for clarity.

Industrial automation environment 100 comprises an automobile manufacturing factory, food processing plant, oil drilling operation, microprocessor fabrication facility, or some other type of industrial enterprise. Machine system 130 could comprise a sensor, drive, pump, filter, drill, motor, robot, fabrication machinery, mill, printer, or any other industrial automation equipment, including their associated control systems. A control system comprises, for example, industrial controller 120, which could include automation controllers, programmable logic controllers (PLCs), or any other controllers used in automation control. In some examples, industrial controller 120 could comprise a ControlLogix® control system provided by Rockwell Automation, Inc. Additionally, machine system 130 could comprise other industrial equipment, such as a brew kettle in a brewery, a reserve of coal or other resources, or any other element that may reside in an industrial automation environment 100.

The controller program content produced by control program editor 110 provides control instructions that may be processed by industrial controller 120 to control the operation of machine system 130. Controller program content includes controller logic, ladder logic, routines, and add-on instructions (AOIs), among other source data that may be used to configure and drive the operation of industrial controller 120. AOIs provide the ability to design more modular code by creating simpler instructions that can be used to build more complex functionality by nesting instructions.

Original Equipment Manufacturers (OEMs), Solution Providers, machine builders, system integrators, and other designers typically generate controller program content using control program editor 110. OEMs typically design and/or build machines, along with their associated control instructions. Solution Providers or system integrators often develop products but do not necessarily build or sell machines or equipment. Instead, Solution Providers typically design controller logic code to program systems to solve industrial problems. For example, a Solution Provider could use control program editor 110 to produce ladder logic that instructs industrial controller 120 to drive machine system 130 to create maple syrup from sap in a new and more efficient way than the commonly-practiced industry standard technique. OEMs, Solution Providers, and other designers and creators of controller program content have an interest in protecting their proprietary controller logic code from being viewed and edited by unauthorized third parties, including the end users who purchase the code.

As shown by the lock icons appearing in FIG. 1, protection can be applied to controller program content to secure controller logic source code and other content from unlicensed use, including unauthorized viewing, editing, and execution. Control system content protection may provide both design-time control of access to view or edit the controller program content and run-time control over the execution of the content. In some examples, this protection may be applied to the controller program content by control program editor 110 or any other software, device, or system.

Devices that execute content, such as industrial controller 120, need to be able to do so in a secure manner that does not expose intellectual property. Content may be created for a device in a separate environment and then transported over insecure networks or other media before reaching the device. Furthermore, content should be tied specifically to one or more devices such that it cannot be freely copied and executed on any similar, unauthorized device. The use of strong public key cryptography, secure key storage, and a public key infrastructure with a root of trust allows for content to be encrypted such that it can only be decrypted and executed by the intended device.

Content creators wish to create content that cannot be read or copied by a third party, yet still can be executed seamlessly on the device or devices for which it was intended. No assurances can be made about the mechanism used to transport this content from the content creator's environment to the receiving device. Therefore, the content creator must take appropriate steps to protect the content's intellectual property, even if it is present in a potentially hostile environment. Attempts to use global encryption keys to solve this problem have significant weaknesses: if an attacker discovers the global key then all content that ever used this mechanism is at risk for exposure. Furthermore, using a global key means that no differentiation can be made between a potential attacker and a potential content creator, since the same party could easily play both roles.

To achieve device-specific cryptographic content protection, in at least one implementation, a unique public/private encryption key pair is generated for each device on which protected content will be run. In the example of FIG. 1, content will be run on industrial controller 120, so a unique public/private encryption key pair is generated for controller 120. The private key is stored within industrial controller 120 in secure storage hardware. The public key is then included in a certificate that is generated and signed by a certificate authority.

After the public/private encryption keys are in place, controller program content is then encrypted using the public key of the device. For example, a user may generate controller program content using control program editor 110, and then encrypt the controller program content with the public key of industrial controller 120, which ensures that only industrial controller 120 is able to decrypt the content. In this same manner, additional content can be generated by the content creator in the future and then encrypted specifically for industrial controller 120. Beneficially, even if industrial controller 120 exists in a potentially hostile environment, the encrypted content can be transmitted to controller 120 such that the confidentiality of the content will be maintained. Note that the public/private encryption key pair and certificate authority can be generated either by the content creator or by the vendor of industrial controller 120; in either case the steps remain the same to protect the content. Additional security benefits can be realized through using more than one encryption key. For example, a key could be stored within the secure storage system of industrial controller 120 as well as one that is contained with secure storage on removable media, such as a secure digital (SD) card. Furthermore, if strong authentication of content is also requested, then the device may be commissioned with a certificate generated by the content creator. If this is the case then the content creator will sign all of the content sent to the device, and the device will verify the content using the certificate. This signed certificate verification can be employed in addition to or instead of the content encryption.

The data protection techniques described herein provide multiple benefits to the content creator. In addition to limiting the exposure of their intellectual property, content creators are able to control the devices on which content is run, placing device replacement sales under direct control of the content creator. For example, to control the market for device replacement, end users could be required to purchase replacement devices directly from the content creator, which was not possible using previous schemes. Content creators may also easily update content or produce new content for the device using the public key, even if the device is running in a potentially hostile environment or the content requires delivery over potentially hostile networks. Further, public keys may be freely distributed so that any party can create content for a given device, since public keys have no confidentiality restrictions. Content protected in this manner also enables legitimate users to seamlessly run the content, and provides strong guarantees that the content has not been tampered with before being executed on the device. An exemplary operation of computing system 101 to facilitate protection of controller program content will now be discussed with respect to FIG. 2.

FIG. 2 is a flow diagram that illustrates an operation 200 in an exemplary implementation. The operation 200 shown in FIG. 2 may also be referred to as data protection process 200 herein. The steps of the operation are indicated below parenthetically. The following discussion of operation 200 will proceed with reference to computing system 101 and industrial controller 120 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate protecting control data used in an industrial automation environment, such as industrial automation environment 100 of FIG. 1. Typically, operation 200 may be performed by computing system 101, although operation 200 could be executed by any systems or devices in some implementations. As shown in the operational flow of process 200, computing system 101 generates an encryption key pair for industrial controller 120, wherein the encryption key pair comprises a public key and a private key (201). Any cryptographic algorithm could be used to generate the public key and the private key of the encryption key pair. The encryption key pair functions such that only the holder of the paired private key can decrypt data encrypted with the public key. The private key would typically be kept secret and known only to a creator of controller program content for use with industrial controller 120. In some examples, the public key may be included in a certificate that is generated and signed by a certificate authority. For example, the certificate authority could create a signed security certificate that includes the public encryption key to establish a root of trust that allows for content to be encrypted such that it can only be decrypted and executed by the intended device having the private key.

The private key is stored within a secure storage system of industrial controller 120 (202). Typically, industrial controller 120 may comprise a secure memory device or some other secure storage hardware that is inaccessible to users of industrial controller 120. The private key may then be stored securely within the secure storage system of industrial controller 120 to prevent anyone from viewing, retrieving, or otherwise accessing the private key. For example, the private key may be stored within the secure storage system using encryption to prevent an end user of industrial controller 120 from accessing the private key. In some implementations, the private key may be hardcoded into the secure storage system of industrial controller 120. The private key could be stored within the secure storage system of industrial controller 120 by a creator of controller program content or a manufacturer or vendor of industrial controller 120 in some examples.

Computing system 101 encrypts controller program content using the public key to generate encrypted controller content (203). Typically, the content creator operates computing system 101 to execute control program editor 110 to create the controller program content, but the controller program content could be created by or received from other systems, devices, or applications in some examples. The controller program content could comprise any information for use in the operation of industrial controller 120, such as configuration data for industrial controller 120, machine control logic for execution by industrial controller 120 to drive machine system 130, ladder logic, routines, add-on instructions (AOIs), controller logic, data sets, drive parameters, cam tables, product formulations, recipes, production data, source code, program instructions, or any other controller program content for industrial controller 120. Typically, the creator of the controller program content would have generated the encryption key pair prior to encrypting the controller program content using the public key to generate the encrypted controller content, such that only the creator of the controller program content has knowledge of the encryption key pair. Accordingly, the creator of the controller program content may encrypt the controller program content using the public key to generate the encrypted controller content to prevent unauthorized viewing, editing, execution, or any other access to or usage of the controller program content. In at least one implementation, the controller program content is encrypted using the public key to generate encrypted controller content for industrial controller 120. For example, computing system 101 could encrypt the controller program content using the public key such that only industrial controller 120 having the matching private key can decrypt and execute the encrypted controller content.

Computing system 101 provides the encrypted controller content to industrial controller 120, wherein industrial controller 120 is configured to decrypt the encrypted controller content using the private key and execute the controller program content (204). In some examples, computing system 101 may provide the encrypted controller content to industrial controller 120 remotely over various communication links or networks, through physical delivery of various types of computer-readable storage media, or any other techniques that may facilitate providing the encrypted controller content to industrial controller 120. Upon being provided with the encrypted controller content, industrial controller 120 may be configured to retrieve the private encryption key from the secure storage system to decrypt the encrypted controller content using the private key and execute the controller program content. In some examples, industrial controller 120 may be configured to execute the controller program content to control an operation of machine system 130. In at least one implementation, controller 120 may be configured to disallow execution of any content received in an unencrypted format and only execute encrypted controller program content that may be decrypted with the private key securely stored within the secure storage system of industrial controller 120. For example, industrial controller 120 could be configured to always retrieve the private encryption key from the secure storage system for use in decrypting the encrypted controller program content prior to execution, and would not execute any content that was not so encrypted.

Advantageously, by encrypting the controller program content using the public key associated with controller 120, computing system 101 generates encrypted controller content, thereby ensuring that only industrial controller 120 can decrypt and execute the content using the corresponding private key. By protecting the controller program content in this manner, the techniques described herein provide the technical advantage of electronically safeguarding proprietary data from unauthorized access, execution, and any other use. Further, by eliminating unauthorized requests to access and use the controller program content, the load on the processors, drives, mechanical components, and other elements in the industrial automation environment may be reduced, resulting in significant energy savings by avoiding unnecessary unauthorized operations. Accordingly, owners of the controller program content can better protect and manage their digital rights over the content they produce.

FIG. 3 is a sequence diagram that illustrates an operation to encrypt content for a device in an exemplary implementation. The following example could be executed by computing system 101 and other elements of industrial automation environment 100, and could also be combined with operation 200 of FIG. 2 in some implementations. For example, the content creator could operate computing system 101 to perform the operations attributed to the content creator in FIG. 3. In this example, the content creator generates content intended for execution on device #1, which could comprise any device on which the content generated by the content creator is intended to run, such as industrial controller 120 of FIG. 1.

Initially, an encryption key pair comprising a public key and a private key is generated for device #1. The private key is securely stored within a secure storage system of device #1, which is inaccessible to the end user of device #1 and may be encrypted or employ some other data security techniques to prevent unauthorized viewing or other usage of the private key. The public key is then included in a certificate that is generated and signed by a certificate authority. The content creator then creates the content intended for execution on device #1 and encrypts the content using the public key associated with device #1. The content creator is then able to safely transfer the encrypted content to device #1, which decrypts the content using the private key and runs the content.

If an end user purchases another device from the content creator that could also run the content, the content creator may wish to prevent the end user from using this second device to execute the content without authorization. However, because the content is encrypted using the public key associated with device #1, only device #1 is capable of decrypting and executing the content, since any other device would not have the unique private key of device #1. The content creator is thus afforded control over the use and execution of the content the creator produces and distributes.

Continuing the example illustrated in the sequence diagram of FIG. 3, the content creator sells device #2 to the end user. The content creator then creates new content intended for exclusive use on device #1, and encrypts the new content using the public key associated with device #1. The content creator can thus provide this new encrypted content to the end user without concern for any unauthorized execution on device #2. This is because any attempt by the end user to run the content on any device other than device #1 would be unsuccessful, because only device #1 has the private key needed to decrypt the new content. Thus, when the content creator sends the new encrypted content to the end user that was encrypted using the public key of device #1, attempts by the end user to view the new encrypted content or execute the new encrypted content on device #2 are unsuccessful. However, when the end user provides the new encrypted content to device #1, device #1 is able to decrypt and run the new content by using the private key that is securely stored in device #1. To securely provide content intended for execution on device #2 to the end user, the content creator could generate a new public/private encryption key pair for device #2, securely store the new private key in device #2, and encrypt content for use on device #2 using the new public key associated with the new private key stored in device #2. Accordingly, the techniques described herein enable content creators to encrypt content using different public/private key pairs for any devices on which an end user desires to run the content, thereby providing improved management and protection of the content they produce.

Referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof.

Industrial controller 120 typically comprises a processing system and communication transceiver. Industrial controller 120 may also include other components such as a router, server, data storage system, and power supply. Industrial controller 120 may reside in a single device or may be distributed across multiple devices. Industrial controller 120 may be a discrete system or may be integrated within other systems, including other systems within industrial automation environment 100 or an automation control system. Some examples of industrial controller 120 include desktop computers, server computers, cloud computing platforms, and virtual machines, as well as any other type of computing system, variation, or combination thereof. In some examples, industrial controller 120 could comprise a programmable logic controller (PLC), programmable automation controller (PAC), data server, database system, networking equipment, or some other computing system, including combinations thereof. In some implementations, a PLC, PAC, and/or specific modules within the PLC rack could provide some or all of the functionality described herein for industrial controller 120.

Computing system 101, industrial controller 120, and machine system 130 could be in communication over one or more communication networks. Such communication networks could comprise multiple network elements such as routers, gateways, telecommunication switches, servers, processing systems, or other communication equipment and systems for providing communication and data services. In some examples, these communication networks could comprise wireless communication nodes, telephony switches, Internet routers, network gateways, computer systems, communication links, or some other type of communication equipment, including combinations thereof. Some examples of communication networks that may be employed include optical networks, packet networks, local area networks (LAN), metropolitan area networks (MAN), wide area networks (WAN), or other network topologies, equipment, or systems, including combinations thereof. Such communication networks may be configured to use various communication protocols, including time-division multiplexing (TDM), Internet Protocol (IP), Ethernet, optical networking, wireless protocols, communication signaling, Bluetooth, IEEE 802.11 protocols (Wi-Fi), near field communication (NFC), or some other communication format, including combinations thereof.

Turning now to FIG. 4, a block diagram that illustrates an industrial automation environment 400 in an exemplary implementation is shown. Industrial automation environment 400 provides an example of an industrial automation environment that may be utilized to implement the data protection processes disclosed herein, but other environments could also be used. Industrial automation environment 400 includes computing system 410, machine system 420, industrial controller 425, database system 430, and application integration platform 435. Machine system 420 and controller 425 are in communication over a communication link, controller 425 and database system 430 communicate over a communication link, database system 430 and application integration platform 435 communicate over a communication link, and application integration platform 435 and computing system 410 are in communication over a communication link. Note that there would typically be many more machine systems in most industrial automation environments, but the number of machine systems shown in FIG. 4 has been restricted for clarity.

Industrial automation environment 400 comprises an automobile manufacturing factory, food processing plant, oil drilling operation, microprocessor fabrication facility, or some other type of industrial enterprise. Machine system 420 could comprise a sensor, drive, pump, filter, drill, motor, robot, fabrication machinery, mill, printer, or any other industrial automation equipment, including their associated control systems. A control system comprises, for example, industrial controller 425, which could include automation controllers, programmable logic controllers (PLCs), programmable automation controllers (PACs), or any other controllers used in automation control. Additionally, machine system 420 could comprise other industrial equipment, such as a brew kettle in a brewery, a reserve of coal or other resources, or any other element that may reside in an industrial automation environment 400.

Machine system 420 continually produces operational data over time. The operational data indicates the current status of machine system 420, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 420 and/or controller 425 is capable of transferring the operational data over a communication link to database system 430, application integration platform 435, and computing system 410, typically via a communication network. Database system 430 could comprise a disk, tape, integrated circuit, server, or some other memory device. Database system 430 may reside in a single device or may be distributed among multiple memory devices.

Application integration platform 435 comprises a processing system and a communication transceiver. Application integration platform 435 may also include other components such as a router, server, data storage system, and power supply. Application integration platform 435 may reside in a single device or may be distributed across multiple devices. Application integration platform 435 may be a discrete system or may be integrated within other systems—including other systems within industrial automation environment 400. In some examples, application integration platform 435 could comprise a FactoryTalk® VantagePoint server system provided by Rockwell Automation, Inc.

The communication links over which data is exchanged between machine system 420, industrial controller 425, database system 430, application integration platform 435, and communication interface 408 of computing system 410 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as time-division multiplexing (TDM), Internet Protocol (IP), Ethernet, telephony, optical networking, wireless protocols, communication signaling, Bluetooth, IEEE 802.11 protocols (Wi-Fi), near field communication (NFC), or some other communication format, including combinations thereof. Some examples of communication networks that may be employed by the communication links include optical networks, packet networks, local area networks (LAN), metropolitan area networks (MAN), wide area networks (WAN), or other network topologies, equipment, or systems, including combinations thereof. The communication links could be direct links or may include intermediate networks, systems, or devices.

Computing system 410 may be representative of any computing apparatus, system, or systems on which the data protection processes disclosed herein or variations thereof may be suitably implemented. Computing system 410 provides an example of a computing system that could be used as a either a server or a client device in some implementations, although such devices could have alternative configurations. Examples of computing system 410 include mobile computing devices, such as cell phones, tablet computers, laptop computers, notebook computers, and gaming devices, as well as any other type of mobile computing devices and any combination or variation thereof. Examples of computing system 410 also include desktop computers, server computers, and virtual machines, as well as any other type of computing system, variation, or combination thereof. In some implementations, computing system 410 could comprise a mobile device capable of operating in a server-like fashion which, among other uses, could be utilized in a wireless mesh network.

Computing system 410 includes processing system 401, storage system 403, software 405, communication interface 408, and user interface 409. Processing system 401 is operatively coupled with storage system 403, communication interface 408, and user interface 409. Processing system 401 loads and executes software 405 from storage system 403. Software 405 includes application 406 and operating system 407. Application 406 may include data protection process 200 in some examples. When executed by computing system 410 in general, and processing system 401 in particular, software 405 directs computing system 410 to operate as described herein for data protection process 200 or variations thereof. In this example, user interface 409 includes display system 411, which itself may be part of a touch screen that also accepts user inputs via touches on its surface. Computing system 410 may optionally include additional devices, features, or functionality not discussed here for purposes of brevity.

Turning now to FIG. 5, a block diagram is shown that illustrates computing system 500 in an exemplary implementation. Computing system 500 provides an example of computing systems 101, 410, or any computing system that may be used to execute data protection process 200 or variations thereof, although such systems could use alternative configurations. Computing system 500 includes processing system 501, storage system 503, software 505, communication interface 507, and user interface 509. User interface 509 comprises display system 508. Software 505 includes application 506 which itself includes data protection process 200. Data protection process 200 may optionally be implemented separately from application 506.

Computing system 500 may be representative of any computing apparatus, system, or systems on which application 506 and data protection process 200 or variations thereof may be suitably implemented. Examples of computing system 500 include mobile computing devices, such as cell phones, tablet computers, laptop computers, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof.

Computing system 500 includes processing system 501, storage system 503, software 505, communication interface 507, and user interface 509. Processing system 501 is operatively coupled with storage system 503, communication interface 507, and user interface 509. Processing system 501 loads and executes software 505 from storage system 503. When executed by computing system 500 in general, and processing system 501 in particular, software 505 directs computing system 500 to operate as described herein for data protection process 200 or variations thereof. Computing system 500 may optionally include additional devices, features, or functionality not discussed herein for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 503 may comprise any computer-readable media or storage media readable by processing system 501 and capable of storing software 505. Storage system 503 may include volatile and nonvolatile, removable and non-removable media implemented in any method or technology for storage of information, such as computer-readable instructions, data structures, program modules, or other data. Storage system 503 may be implemented as a single storage device but may also be implemented across multiple storage devices or sub-systems co-located or distributed relative to each other. Storage system 503 may comprise additional elements, such as a controller, capable of communicating with processing system 501. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 509, processing system 501 loads and executes portions of software 505, such as data protection process 200, to render a graphical user interface for application 506 for display by display system 508 of user interface 509. Software 505 may be implemented in program instructions and among other functions may, when executed by computing system 500 in general or processing system 501 in particular, direct computing system 500 or processing system 501 to generate an encryption key pair for an industrial controller, wherein the encryption key pair comprises a public key and a private key and the private key is stored within a secure storage system of the industrial controller. Software 505 may further direct computing system 500 or processing system 501 to encrypt controller program content using the public key to generate encrypted controller content. In addition, software 505 directs computing system 500 or processing system 501 to provide the encrypted controller content to the industrial controller, wherein the industrial controller is configured to decrypt the encrypted controller content using the private key and execute the controller program content.

Software 505 may include additional processes, programs, or components, such as operating system software or other application software. Examples of operating systems include Windows®, iOS®, and Android®, as well as any other suitable operating system. Software 505 may also comprise firmware or some other form of machine-readable processing instructions executable by processing system 501.

In general, software 505 may, when loaded into processing system 501 and executed, transform computing system 500 overall from a general-purpose computing system into a special-purpose computing system customized to facilitate protecting control data used in an industrial automation environment as described herein for each implementation. For example, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-storage media are characterized as primary or secondary storage.

In some examples, if the computer-storage media are implemented as semiconductor-based memory, software 505 may transform the physical state of the semiconductor memory when the program is encoded therein. For example, software 505 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a computing system with which software 505 is deployed and executed in order to implement application 506 and/or data protection process 200 (and variations thereof). However, computing system 500 may also represent any computing system on which software 505 may be staged and from where software 505 may be distributed, transported, downloaded, or otherwise provided to yet another computing system for deployment and execution, or yet additional distribution. For example, computing system 500 could be configured to deploy software 505 over the interne to one or more client computing systems for execution thereon, such as in a cloud-based deployment scenario.

Communication interface 507 may include communication connections and devices that allow for communication between computing system 500 and other computing systems (not shown) or services, over a communication network 511 or collection of networks. In some implementations, communication interface 507 receives dynamic data 521 over communication network 511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 509 may include a voice input device, a touch input device for receiving a gesture from a user, a motion input device for detecting non-touch gestures and other motions by a user, and other comparable input devices and associated processing elements capable of receiving user input from a user. Output devices such as display system 508, speakers, haptic devices, and other types of output devices may also be included in user interface 509. The aforementioned user input devices are well known in the art and need not be discussed at length here. User interface 509 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method of protecting control data used in an industrial automation environment, the method comprising:
   generating, by a system comprising a processor, a device-specific encryption key pair for an industrial controller, wherein the device-specific encryption key pair comprises a public key and a private key;
   storing, by the system, the private key within a secure storage system of the industrial controller;
   encrypting, by the system, controller program content using the public key to generate encrypted controller content;
   providing, by the system, the encrypted controller content to the industrial controller, wherein the industrial controller is able to decrypt the encrypted controller content using the private key and execute the controller program content;
   creating, by the system, new controller program content for the industrial controller;
   encrypting, by the system, the new controller program content with the public key to generate new encrypted controller content; and
   providing, by the system, the new encrypted controller content to an end user comprising the industrial controller and an additional device, wherein the industrial controller is able to decrypt the new encrypted controller content and the additional device is not able to decrypt the new encrypted controller content.

2. The method of claim 1 wherein the industrial controller, to store the private key within the secure storage system of the industrial controller, prevents end users from accessing the private key by storing the private key within the secure storage system using encryption.

3. The method of claim 1 further comprising establishing a root of trust, wherein a certificate authority generates and signs a certificate in which the public key is comprised.

4. The method of claim 1 wherein the industrial controller is configured to execute the controller program content to control an operation of a machine system.

5. The method of claim 1 wherein the controller program content comprises configuration data for the industrial controller.

6. The method of claim 1 wherein the controller program content comprises machine control logic for execution by the industrial controller to drive a machine system.

7. The method of claim 1 wherein the controller program content comprises ladder logic for execution by the industrial controller.

8. A non-transitory computer-readable medium having stored thereon instructions to facilitate protecting control data used in an industrial automation environment, wherein the instructions, in response to execution, cause a system comprising a processor to perform operations, the operations comprising:
   generating a device-specific encryption key pair for an industrial controller, wherein the device-specific encryption key pair comprises a public key and a private key;
   storing the private key within a secure storage system of the industrial controller;
   encrypting controller program content using the public key to generate encrypted controller content;
   providing the encrypted controller content to the industrial controller, wherein the industrial controller is able to decrypt the encrypted controller content using the private key and execute the controller program content;
   creating new controller program content for the industrial controller;
   encrypting the new controller program content with the public key to generate new encrypted controller content; and
   providing the new encrypted controller content to an end user comprising the industrial controller and an additional device, wherein the industrial controller is able to decrypt the new encrypted controller content and the additional device is not able to decrypt the new encrypted controller content.

9. The computer-readable medium of claim 8 wherein the industrial controller stores the private key within the secure storage system in an encrypted state to prevent an end user of the industrial controller from accessing the private key.

10. The computer-readable medium of claim 8 wherein the operations further comprise establishing a root of trust, wherein a certificate authority generates and signs a certificate in which the public key in comprised.

11. The computer-readable medium of claim 8 wherein the industrial controller is configured to execute the controller program content to control an operation of a machine system.

12. The computer-readable medium of claim 8 wherein the controller program content comprises configuration data for the industrial controller.

13. The computer-readable medium of claim 8 wherein the controller program content comprises machine control logic for execution by the industrial controller to drive a machine system.

14. The computer-readable medium of claim 8 wherein the controller program content comprises ladder logic for execution by the industrial controller.

15. A system for protecting control data used in an industrial automation environment, the system comprising:
   a memory that stores executable components; and
   a processor, operatively coupled to the memory, that executes the executable components, the executable components comprising a content creation component configured to:
      generate a device-specific encryption key pair for an industrial controller, wherein the device-specific encryption key pair comprises a public key and a private key and the private key is stored within a secure storage system of the industrial controller;
      encrypt controller program content using the public key to generate encrypted controller content; and
      provide the encrypted controller content to the industrial controller, wherein the industrial controller is able to decrypt the encrypted controller content using the private key and execute the controller program content;
      create new controller program content for the industrial controller;
      encrypt the new controller program content with the public key to generate new encrypted controller content; and
      provide the new encrypted controller content to an end user comprising the industrial controller and an additional device, wherein the industrial controller is able to decrypt the new encrypted controller content and the additional device is not able to decrypt the new encrypted controller content.

16. The system of claim 15 wherein the private key stored within the secure storage system uses encryption to prevent an end user of the industrial controller from accessing the private key.

17. The system of claim 15 wherein the content creation component is further configured to establish a root of trust, wherein a certificate authority generates and signs a certificate in which the public key is comprised.

18. The system of claim 15 wherein the industrial controller is further configured to execute the controller program content to control an operation of a machine system.

19. The system of claim 15 wherein the controller program content comprises configuration data for the industrial controller.

20. The system of claim 15 wherein the controller program content comprises machine control logic for execution by the industrial controller to drive a machine system.

* * * * *